US012072521B2

United States Patent
Dragic et al.

(10) Patent No.: US 12,072,521 B2
(45) Date of Patent: Aug. 27, 2024

(54) OPTICAL FIBER WITH LOW THERMO-OPTIC COEFFICIENT

(71) Applicants: The Board of Trustees of the University of Illinois, Urbana, IL (US); Clemson University, Clemson, SC (US)

(72) Inventors: Peter D. Dragic, Champaign, IL (US); John Ballato, Clemson, SC (US); Thomas W. Hawkins, Clemson, SC (US)

(73) Assignees: THE BOARD OF TRUSTEES OF THE UNIVERSITY OF ILLINOIS, Urbana, IL (US); CLEMSON UNIVERSITY, Clemson, SC (US)

( * ) Notice: Subject to any disclaimer, the term of this patent is extended or adjusted under 35 U.S.C. 154(b) by 355 days.

(21) Appl. No.: 17/079,090

(22) Filed: Oct. 23, 2020

(65) Prior Publication Data
US 2021/0126422 A1    Apr. 29, 2021

Related U.S. Application Data

(60) Provisional application No. 62/925,013, filed on Oct. 23, 2019.

(51) Int. Cl.
| | |
|---|---|
| *G02B 6/02* | (2006.01) |
| *F21V 8/00* | (2006.01) |
| *H01S 3/067* | (2006.01) |
| *H01S 3/16* | (2006.01) |

(52) U.S. Cl.
CPC ....... *G02B 6/0003* (2013.01); *G02B 6/02004* (2013.01); *H01S 3/06716* (2013.01); *H01S 3/1601* (2013.01)

(58) Field of Classification Search
None
See application file for complete search history.

(56) References Cited

U.S. PATENT DOCUMENTS

| | | | | |
|---|---|---|---|---|
| 2004/0052495 | A1* | 3/2004 | Englund | H01S 3/06716 385/141 |
| 2005/0163445 | A1* | 7/2005 | Hanashima | G02B 6/132 385/132 |

FOREIGN PATENT DOCUMENTS

| | | | | |
|---|---|---|---|---|
| CA | 2346130 | A1 * | 5/2000 | |
| CN | 107390318 | A * | 11/2017 | |
| WO | WO-2004030165 | A1 * | 4/2004 | G02B 6/024 |

OTHER PUBLICATIONS

Dawson et al., "Analysis of the scalability of diffraction-limited fiber lasers and amplifiers to high average power," Optics Express, vol. 16, No. 17, pp. 13240-13266, 2008.
Richardson et al., "High power fiber lasers: current status and future perspectives," Journal of the Optical Society of American B, vol. 27, No. 11, pp. B63-B92, 2010.

(Continued)

*Primary Examiner* — Chris H Chu
(74) *Attorney, Agent, or Firm* — Crowell & Moring LLP (57) ABSTRACT

A fiber includes a core and cladding, both of which may have temperature dependent indices of refraction. The materials and size of the core and cladding may be selected such that as the temperature of the core and/or cladding is heated above room temperature, the fiber transitions from supporting multimode optical waveguiding to supporting single mode waveguiding.

16 Claims, 5 Drawing Sheets

(56) References Cited

OTHER PUBLICATIONS

Zhou et al., "Review on recent progress on mid-infrared fiber lasers," Laser Physics, vol. 22, No. 11, pp. 1744-1751, 2012.
Jauregui et al., "High-power fibre lasers," Nature Photonics, vol. 7, pp. 861-867, 2013.
Ferman et al., "Utrafast fibre lasers," Nature Photonics, vol. 7, pp. 868-874 (2013).
Zervas, "High power ytterbium-doped fiber lasers—fundamentals and applications," International Journal of Modern Physics B, vol. 28, No. 12, pp. 1442009, 2014.
Zervas et al., "High Power Fiber Lasers: A Review," vol. 20, No. 5, pp. 0904123, 2014.
Fu et al., "Review of recent progress on single-frequency fiber lasers," vol. 34, No. 3, pp. A49-A62, 2017.
Dragic et al., "Materials for optical fiber lasers: A review," Applied Physics Reviews, vol. 5, No. 4, pp. 041301, 2018.
Dong, "Stimulated thermal Rayleigh scattering in optical fibers," Opt. Express 21(3), 2642, 2013.
Lapointe et al., "Thermal effects in high-power CW fiber lasers," Fiber Lasers VI Technol. Syst. Appl. 7195, Feb. 2009, 71951U, 2009.
Dong, "Advanced Optical Fibers for High Power Fiber Lasers," in Advances in Optical Fiber Technology: Fundamental Optical Phenomena and Applications, edited by M. Yasin, InTech, London, UK, 2015, Chap. 7, pp. 221-252.
Dragic et al., "A unified materials approach to mitigating optical nonlinearities in optical fiber. II. B. The optical fiber, material additivity and the nonlinear coefficients," International Journal of Applied Glass Science, vol. 9, No. 3, pp. 307-318, 2018.
Nufern, "25/400 Ytterbium-Doped LMA Double Clad Fibers," Coherent, Specialty Optical Fibers, downloaded from the internet: https://www.nufern.com/pam/optical_fibers/908/LMA-YDF-25/400-VIII/, 2013, 4 pages.

\* cited by examiner

OPTICAL FIBER WITH LOW THERMO-OPTIC COEFFICIENT

PRIORITY

This application claims priority to U.S. Provisional Patent Application No. 62/925,013, filed 23 Oct. 2019, and titled Optical Fiber with Low Thermo-Optic Coefficient, which is incorporated in its entirety.

FEDERALLY SPONSORED RESEARCH OR DEVELOPMENT

This invention was made with government support under N00014-17-1-2546 awarded by the Office of Naval Research. The government has certain rights in the invention.

TECHNICAL FIELD

This disclosure relates to an optical fiber with a low thermo-optic coefficient.

BACKGROUND

Industrial, research, and commercial systems are increasingly reliant on high average power laser systems. As one example, industrial metalworking may use fiber laser systems with continuous wave outputs over 100 kilowatts. Improvements in power stability and scalability will continue to increase the performance of such laser systems.

DETAILED DESCRIPTION

In high average power fiber applications, the sometimes many kilowatts of light propagating through the fiber (which my serve as a gain medium for a laser or optical amplifier) may lead to heating. In some cases, the heating may be position specific thereby "imprinting" the cross-sectional intensity profile of the guided beam into the fiber by heating the fiber most in those cross-sectional positions exposed to the highest intensity fields.

Accordingly, the presence of multiple transverse modes in the fiber can lead to an irregular interference pattern. This interference pattern can cause strong and randomized coupling between these transverse modes. This can cause the beam to become erratic and chaotic. This transverse mode instability (TMI) is a parasitic effect that places an upper bound on the power that can be supported or produced by a fiber as a gain medium. This, in turn, may place a bound on the power output of a fiber laser system as a whole.

In various implementations, a fiber with a core and cladding may be structured such that the fiber transitions from multimode operation, e.g., supporting guiding of multiple modes (e.g., 2, 3, 4, 5, or more modes), to single mode operation, e.g., supporting guiding of one 'fundamental' mode while being non-guiding for other modes (in some cases, all other modes). In a gain medium, in some cases, a bias to one mode may be sufficient to cause relative extinction of other modes. For example, a mode with a slight efficiency advantage may see greater amplification than other modes, thereby resulting in its being dominant over the other modes. With insufficient gain, the other modes may instead be exposed to net loss. In some cases, the difference between the core index and cladding index (or effective indices) may determine whether a fiber is single mode or multimode at room temperature. Additionally or alternatively, a reduction occurring as a temperature dependent change in the indices of the core and/or cladding, may cause the transition from multimode to single mode (or fewer modes).

The core and/or cladding may include dopants (such as, phosphorus pentoxide, aluminum phosphate, boron trioxide, fluorine or other dopants with a value of dn/dT selected for control of the temperature dependence of the refractive index) that alter the change in refractive index, n, with respect to temperature, T, of the glass making up the core and/or cladding. Thus, the relative refractive indices of the core and cladding may change as the temperature of the fiber changes. For example, the dopants listed above may reduce dn/dT for silica substrates. In many cases, fibers may be fabricated using silica as a base material. In some cases, the value of dn/dT (e.g., for the core or cladding) may be negative. Accordingly, the value of the index may decrease for increasing temperature. In an example, the core may have a negative thermo-optic coefficient (dn/dT) while the cladding has a positive thermo-optic coefficient. Accordingly, in the example, the difference between the index of the core and the index of the cladding may decrease with increasing temperature.

In various implementations, the mode cross-sectional size (e.g., increased mode area) may increase with increasing temperature for these fibers for which index difference decreases with temperature. In some cases, the increase in mode cross-sectional size may reduce the effect of non-linearities in the fiber. The increased mode size may decrease field strength. In some cases, decreased field strength may decrease non-linear effects. In some implementations, non-linear effects may be considered parasitic effects that reduce optical power in desired processes. For example, in laser cavities some non-linear effect may reduce net gain in the desired lasing mode or at the desired lasing wavelength.

Figure 1:
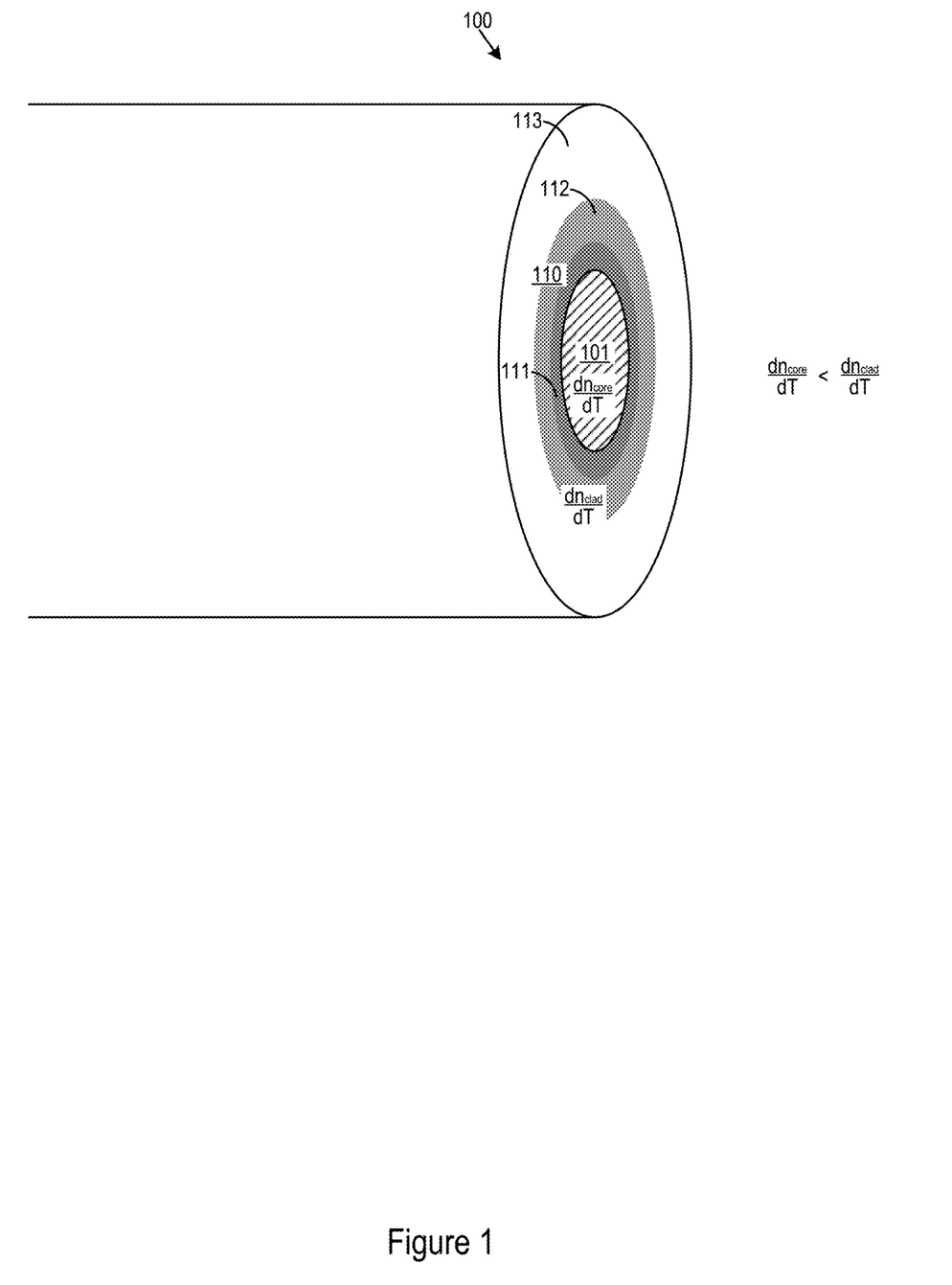
FIG. 1 shows an example cross-sectional view of an example fiber.

FIG. 1 shows an example cross-sectional view of an example fiber 100. In the example fiber, dn/dT of the core 101 is less than dn/dT of the cladding 110. The cladding may have one or more material layers 111, 112, 113 (or a continuously varying profile) which may have different indices and/or values of dn/dT.

Figure 2:
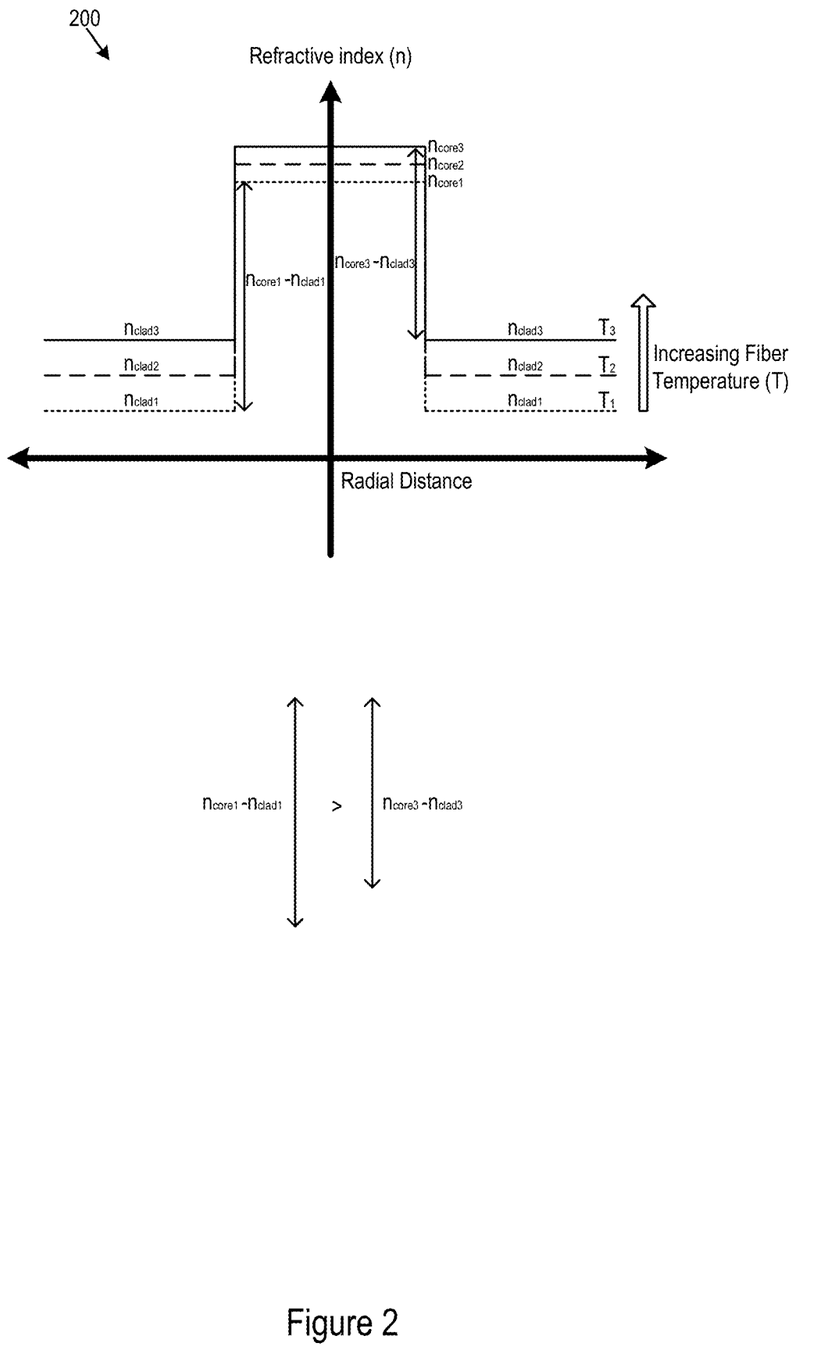
FIG. 2 shows an example plot of index profiles for an example fiber at three different temperatures.

FIG. 2 shows an example plot 200 of index profiles for an example fiber at three different temperatures. In the example fiber, dn/dT of the core is less than dn/dT of the cladding. Therefore, the difference between the indices of the core and cladding is less at $T_3$ that the difference between the indices of the core and cladding at $T_1$.

In some cases, the fiber may support room-temperature multimode operation (at least in part) based on the mode area supported by the core size of the fiber. For example, the fiber may include a large mode area (LMA) core. In some cases, the diameter of the core may be between 5-50 microns, 10-40 microns, 10-30 microns, 20-30 microns, or about 25 microns. Other size ranges may be used.

For example, the temperature dependent indices of the core and cladding may be selected such that, as the fiber is heated, e.g., above room temperature, the difference between the index of the core and the index of the cladding is reduced. This reduction may tend to reduce the number of spatial modes for which the fiber supports guiding. In some cases, for a fiber: the fiber dopants, core size, and relative indices at room temperature may be selected such that the fiber is multimode and/or 'few mode' at room temperature and single mode at within a guiding temperature range. The guiding temperature range may include the temperatures for which the fiber is single mode, e.g., the 'guiding temperatures.' In some cases, the guiding temperatures may be above 50° C. However, other guiding temperature ranges are possible. For example, 50° C.-300° C., 30° C.-300° C., 40° C.-200° C., 50° C.-150° C., 75° C.-150° C., 100° C.-200° C., above 30° C., above 40° C., above 75° C., above 100° C., or other temperature ranges heated relative to room temperature. These ranges bounds may be adjusted ±5° C.-10° C. such that they are 'about' the stated bounds. The guiding temperature range may be selected based on a target operating temperature of the fiber system. In an illustrative scenario, a particular fiber amplifier may maintain a gain fiber temperature between 120° C.-180° C. (e.g., an operating temperature range). In this illustrative scenario, the gain fiber may be structured to have single mode operation (e.g., a guiding temperature range) over a portion of (or the entirety of) the operating temperature range. For example, the fiber might be selected to have single mode operation at 75° C.-150° C. 100° C.-200° C., or another range overlapping (at least in part) with the operating temperature range. In various implementations, room temperature may refer to temperatures ranging from about 15° C.-30° C.

In some implementations, a fiber core may include dopants such as ytterbium, erbium, and/or thulium e.g., to support operation as a gain medium (e.g., for a laser, an amplifier, or other optical device using a fiber gain medium).

The cladding may be characterized by one or more cladding indices (and/or a cladding index that may be a function of radius (e.g., distance from the center of the fiber) and/or cladding depth. As an example, in some cases, the fiber may include a step-index fiber (SIF).

In some cases, the change of the index of the cladding with respect to temperature (dn/dT) may vary from innermost portions of the cladding to the outer most portions. However, in some implementations, the variation in the dn/dT for the cladding may be focused on the innermost portions of the cladding and then reach a constant value for the outermost portions. In some cases, using a dn/dT in the portion of the cladding closest to the fiber core may allow for control of the cladding index in the regions where the evanescent field outside the core is the strongest and/or the coupling between the core modes and the cladding field is the strongest. The cladding may achieve the variance through a series of discrete material changes or continuous variance.

In various implementations, varying the dn/dT along the radius of the cladding may be used to counteract effects from non-uniform heating in the cladding. For example, the guided optical power may be strongest in the core of the fiber and become weaker with increasing distance into the cladding. Accordingly, for the cladding, heating may be strongest near the core and weakest farthest from the core. In some cases, this may lead to a refractive index profile that is non-uniform in the cladding (e.g., tails radiating out from the core). Varying dn/dT along the radius of the cladding may counteract this non-uniform change due to heating (e.g., by reducing the effect on index in the cladding by heating near the core relative to the effect in the cladding farther from the core).

Figure 3:
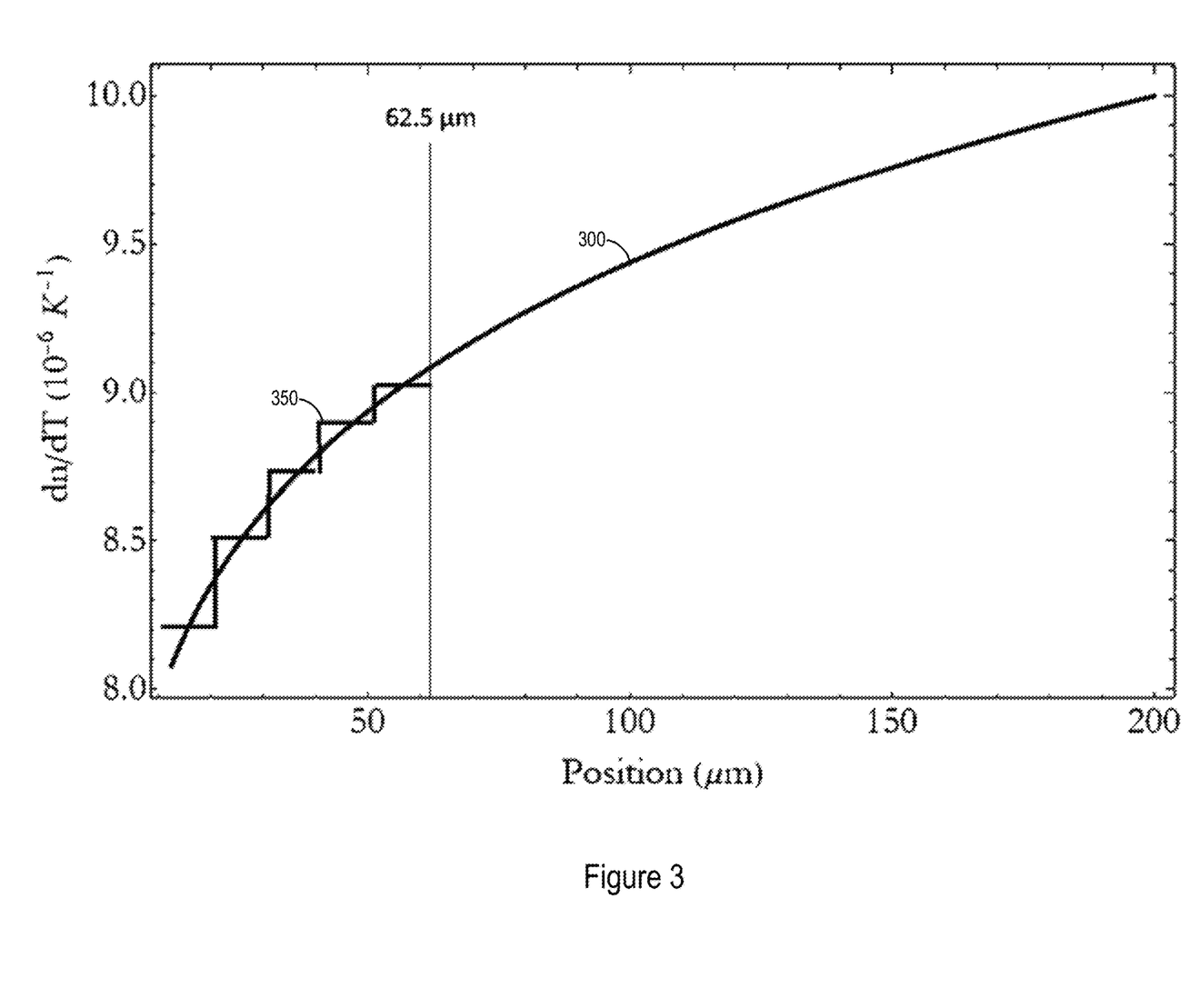
FIG. 3 shows an example continuous thermo-optic profile and an example stepwise thermo-optic profile.

For example, FIG. 3 shows an example continuous dn/dT profile 300 and an example stepwise dn/dT profile 350. The stepwise profile 350 estimates the continuous profile 300 using multiple steps. Including the core, six steps are used (step numbers 0-5 in Table 1 below). However, in various implementations, other numbers of steps may be used. The example profiles 300, 350 may be selected to counteract heating effects on the cladding index profile during fiber operation. The example profiles may maintain a constant cladding index along the radius of the fiber. Table 1 shows example fiber dopant concentrations that may be used to construct the example stepwise profile 350.

TABLE 1

Example Fiber Dopant Concentrations

| Step Number | Region (μm) | $P_2O_5$ (mole %)* | $B_2O_3$ (mole %) |
|---|---|---|---|
| 0 (Core) | 0-12.5 | 3.73** | 3.85** |
| 1 | 12.5-22.5 | 1.98 | 3.30 |
| 2 | 22.5-32.5 | 1.71 | 2.85 |
| 3 | 32.5-42 5 | 1.50 | 2.50 |
| 4 | 42.5-52.5 | 1.35 | 2.25 |
| 5 | 52.5-62.5 | 1.26 | 2.10 |

In various implementations, an example radial distribution of dn/dT as a function of radius (r) may be given by:

$$\frac{dn}{dT}r = \frac{dn}{dT}(r=b)\frac{\Delta T(r=b)}{\Delta T(r)}$$

Where b is the position of the outer boundary LT is the active cooling rate of the fiber (as a function of radius). This radial function may result in a cladding index change that is uniform along the radius of the cladding.

Figure 4:
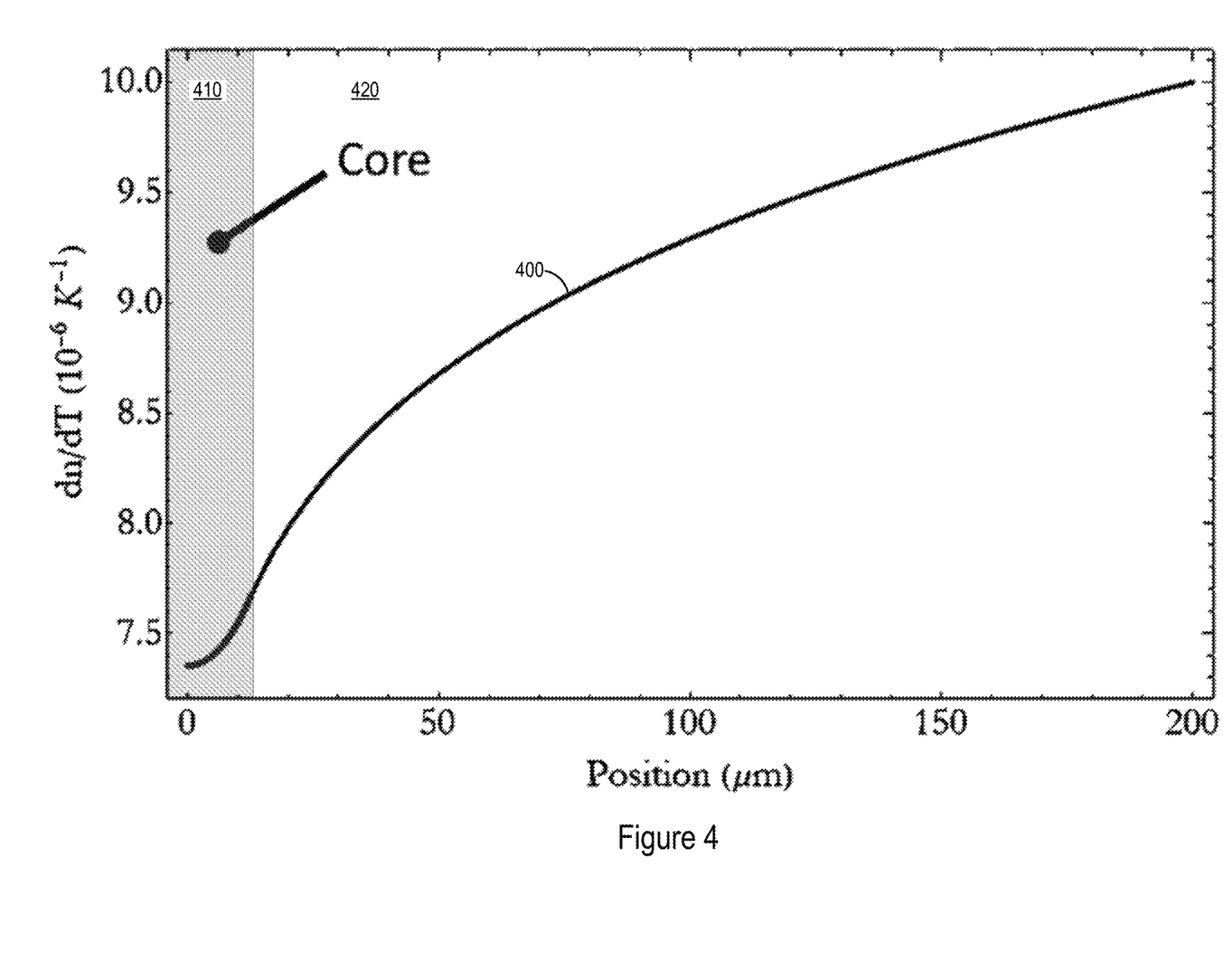
FIG. 4 shows a second example continuous thermo-optic profile.

FIG. 4 shows a second example continuous dn/dT profile 400. The second continuous profile 400 may be selected to provide a constant numerical aperture (NA) across operating temperatures for a step-index fiber. The second example continuous dn/dT profile 400 shows dn/dT for core 410 and cladding 420 regions. In various implementations the second example continuous dn/dT profile 400 may be approximated by multiple stepwise changes.

In some implementations, where a fiber may be characterized by the single core index and a single cladding index, the fiber may further be characterized by a 'V-number' where:

$$V\text{- number} = \frac{\pi D \sqrt{n_{core}^2 - n_{clad}^2}}{\lambda},$$

where is the D diameter of the core, $n_{core}$ is the index of the core, $n_{clad}$ is the index of the cladding, and $\lambda$ is the wavelength of guided light. In various implementations, the fiber may be characterized by a V-number less than 2.405 when the fiber is above room temperature and above 2.405 when the fiber is at room temperature. For example, at room temperature, the fiber may be above 3.8317, 5.1356, and/or 5.5201. As the V-number increases a fiber may support more modes. The V-number may be assumed to have a positive value.

In some implementations, the contribution from bending loss (e.g., loss dependent on the bending radius of bends in the fiber) may be temperature dependent. Further, bending loss (temperature dependent bending loss and/or temperature independent bending loss) may be used to tune the loss of various modes in the fiber.

The concentration of dopants may be adjusted to control the value of dn/dT for the fiber core and cladding. Accordingly, the temperature dependence of the V-number (which determines the number of guided modes for a fiber and depends on the difference of square of the core/cladding indices) may be controlled.

Figure 5:
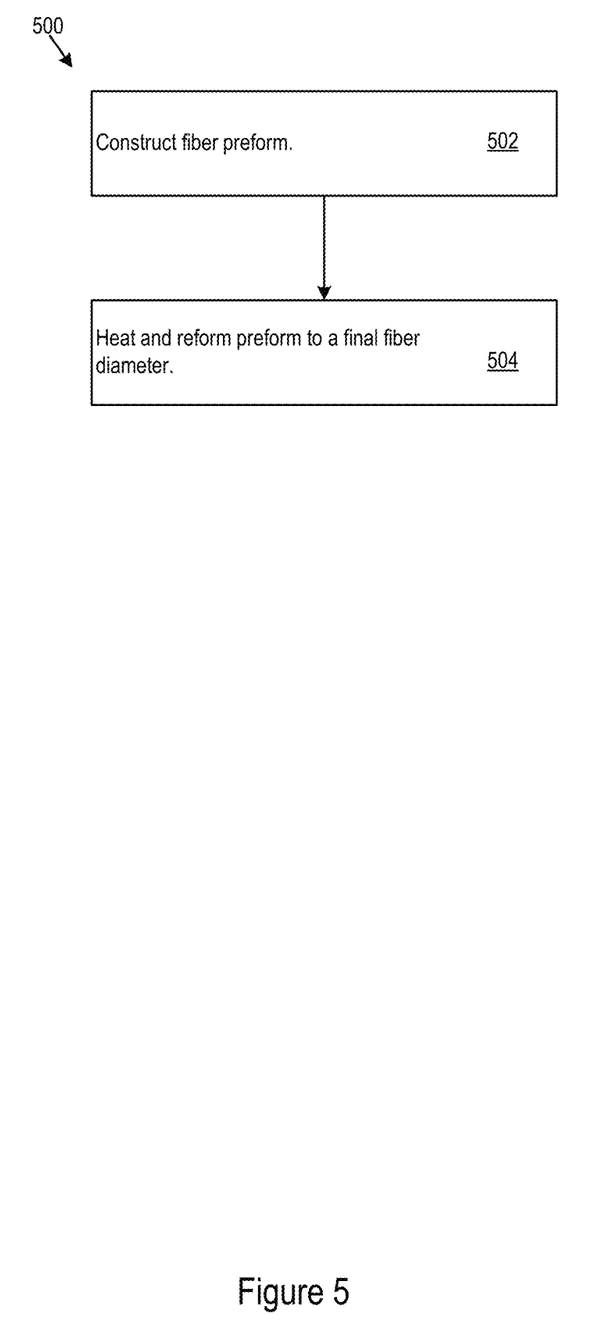
FIG. 5 shows an example technique for fabricating a fiber.

The fiber may be fabricated using various techniques. FIG. 5 show an example technique 500 for fabricating a fiber. A fiber preform may be constructed with various dopant concentrations for the core and cladding (502). The fiber preform may be heated and drawn or extruded to a final diameter (504). In an example, chemical vapor deposition (CVD) and a preform lathe may be used to fabricate a chemically pure fiber preform. CVD may be used to deposit material in thin layers on a rotating preform. Dopants may be added during the CVD process. The preform may then be drawn using a fiber draw tower. Other vapor deposition schemes may also be used such as modified CVD (MCVD) or outside vapor deposition (OVD).

In some implementations, stack and draw method may be used to form the preform. Glass preforms (e.g., with hexagonal cross-sections), may be stacked together in parallel and then drawn. A core of differently doped glass may be placed in the center of the stack to form the core.

In some implementations, a core preform (e.g., a rod shape) may be placed in a sleeve preform (e.g., a tube shape) to form the cladding and then drawn.

In some implementations, fluid-phase manufacture may be used to form the structure of the fiber. For example, a sol-gel process may be used. The fiber may be structured while material is deposited in a fluid phase (e.g., a solution). Then the material may be cured to create a solid fiber with a rigid structure. In some cases, the operating temperature of a fiber being used as a gain medium may exceed that which can be sustained by a fiber constructed through a sol-gel process. Accordingly, for certain materials and operating temperature ranges fabrication methods other than sol-gel may be used.

Various other fiber fabrication techniques may used, such as rod-in-tube preforms, vapor deposition using chelates, or other fiber fabrication techniques compatible with the introduction of dopants to tailor the ratio of do/dT in the core relative to that in the cladding.

Table 2 shows various examples.

TABLE 2

Examples

1. A fiber including:
a cladding;
a core surrounded by the cladding,
the core configured to support propagating light in multiple guided modes at about room temperature, the multiple guided modes; and
the core configured to, at a guiding temperature above room temperature, support propagating light in a fundamental mode and cause other modes to not be guided.

TABLE 2-continued

Examples

2. A fiber including:
a cladding; and
a core,
where the core and cladding are formed to support multimode guiding at about room temperature and single mode guiding at a guiding temperature above room temperature.
2B. The fiber of example 2 where:
Optionally, the core is configured to have a thermo-optic coefficient less than that of the outer cladding region
Optionally, the core is configured to have a thermo-optic coefficient less than that of a region outside of the guiding core region.
2C. The fiber of example 2B where the thermo-optic coefficient of the core is ½ that of the outer region
2D. The fiber of example 2B where the thermo-optic coefficient of the core is ¼ that of the outer region
2E. The fiber of example 2B where the thermo-optic coefficient of the core is zero.
2F. The fiber of example 2B where the thermo-optic coefficient of the core is negative-valued.
2G. A fiber including:
a cladding; and
a core,
where the core and cladding are formed to support multimode guiding at about room temperature and fewer modes guided at a fiber temperature above room temperature.
2H. A fiber including:
a cladding; and a core,
where the core and cladding are formed to have a refractive index difference at about room temperature
where the refractive index difference is reduced at a fiber temperature above room temperature
2J. The fiber of example 2H where:
bending loss for higher order modes increases at a fiber temperature above room temperature, where:
optionally, the fiber includes a bend; and
optionally, loss over the bend increases disproportionately for a higher order mode relative to a fundamental mode.
2K. A fiber including: a core; and
a cladding characterized by a cladding index, where the temperature-dependence of the cladding index varies with the radius of the fiber, where:
optionally, the fiber is in accord with the fiber of any of the preceding claims.
2L. The fiber of any of the preceding examples, where the cladding index varies with the radius of the fiber.
2M. The fiber of any of the preceding examples, where variance of the temperature dependence with radius is selected based on a level of active cooling applied to the fiber.
2N. The fiber of any of the preceding examples, where the temperature dependence of the cladding index varies with the radius of the fiber in a stepwise fashion or continuous fashion.
2O. The fiber of any of the preceding examples, where radial stepwise temperature-dependence values for the cladding are selected to approximate a continuous function.
2P. The fiber of any of the preceding examples, where the radial stepwise temperature-dependence of the fiber is created by varying a dopant level in the cladding.
2Q. The fiber of any of the preceding examples, where dopant levels in the fiber are selected in accord with those in Table 1 above.
2R. The fiber of any of the preceding examples where the temperature dependence of the cladding becomes constant with respect to radius above a selected value of the radius, where:
optionally, the selected value is selected based on a level of coupling between the field at the value and a core mode; and
optionally, the selected value is selected based on a heating effect of guided optical power at the selected value.
3. A fiber including:
a cladding characterized by a cladding index; and a core, characterized by a temperature-dependent core index, where, when the fiber is heated above room temperature, a difference between the cladding index and the temperature-dependent core index is reduced.
4. The fiber of any of the preceding examples where, the difference between the core index and the cladding index determines whether the fiber is multimode or single mode.
5. The fiber of any of the preceding examples, and optionally example 3, where the reduction in the difference causes every mode except a fundamental mode to be non-guided.

TABLE 2-continued

Examples

6. The fiber of any of the preceding examples where, the fiber includes at least a portion of a gain medium of a fiber laser and/or a fiber amplifier.
7. The fiber of any of the preceding examples where, the core is doped phosphorus pentoxide, aluminum oxide, aluminum phosphate, boron trioxide, fluorine, or any combination thereof, where optionally, the dopant support temperature dependence of the index of the core and/or cladding.
8. The fiber of any of the preceding examples where, the core is doped with an active ion, where optionally, the active ion includes ytterbium, erbium, and/or thulium.
9. The fiber of any of the preceding examples where, the fiber supports single mode guiding in a guiding temperature range, where:
optionally, the guiding temperature range is any range within about 30° C. to about 300° C.;
optionally, the guiding temperature range is any range within about 40° C. to about 250° C.;
optionally, the guiding temperature range is any range within about 50° C. to about 200° C.;
optionally, the guiding temperature range is any range within about 50° C. to about 150° C.;
optionally, the guiding temperature range is any range within about 75° C. to about 150° C.;
optionally, the guiding temperature range is any range within about 100° C. to about 200° C.;
optionally, the guiding temperature range any range above about 30° C.;
optionally, the guiding temperature range any range above about 40° C.;
optionally, the guiding temperature range any range above about 50° C.;
optionally, the guiding temperature range any range above about 75° C.;
optionally, the guiding temperature range any range above about 100° C.; and
optionally, the guiding temperature range includes any range including only temperatures above room temperature.
10. The fiber of any of the preceding examples, where the fiber supports multimode guiding outside of a guiding temperature range.
11. The fiber of any of the preceding examples, where the fiber is a large mode area fiber.
12. The fiber of any of the preceding examples, where a diameter of the core is greater than 5 microns, where:
optionally, the diameter of the core is between 5 microns and 50 microns;
optionally, the diameter of the core is between 10 microns and 40 microns;
optionally, the diameter of the core is between 10 microns and 30 microns;
optionally, the diameter of the core is between 20 microns and 30 microns; and
optionally, the diameter of the core is about 25 microns.
13. The fiber of any of the preceding examples, where a V-number of the fiber is less than 2.405 when the fiber is within a guided temperature range, where the V-number is defined to be $$\frac{\pi D \sqrt{n_{core}^2 - n_{clad}^2}}{\lambda},$$ where is the D diameter of the core, $n_{core}$ is the index of the core, $n_{clad}$ the index of the core, $n_{clad}$ is the index of the cladding, and $\lambda$ is the wavelength of guided light.
14. The fiber of any of the preceding examples, where a V-number of the fiber is above 2.405 when the fiber is at about room temperature, where:
optionally, the V-number is above 3.8317 at about room temperature;
optionally, the V-number is above 5.1356 at about room temperature; and
optionally, the V-number is above 5.5201 at about room temperature.
15. The fiber of any of the preceding examples, where the fiber supports guiding for two or more modes at about room temperature, where:
optionally, the fiber supports guiding for three or more modes at about room temperature;
optionally, the fiber supports guiding for four or more modes at about room temperature;
optionally, the fiber supports guiding for five or more modes at about room temperature; and
optionally, the fiber supports guiding for ten or more modes at about room temperature.
16. The fiber of any of the preceding examples, where the core includes silica, where:
optionally, the silica of the core is doped with phosphorus pentoxide, aluminum oxide, aluminum phosphate, flourine, ytterbium(III) oxide, boron trioxide, or any combination thereof;

TABLE 2-continued

Examples optionally, the silica of the core is doped with phosphorus pentoxide, aluminum phosphate, erbium(III) oxide, and boron trioxide, or any combination thereof;
optionally, the silica of the core is doped with phosphorus pentoxide, aluminum phosphate, Thulium(III) oxide, and boron trioxide, or any combination thereof;
and
optionally, the silica of the core is doped with 5.1 mole % phosphorus pentoxide, 1.7 mole % aluminum phosphate, 0.3 mole % ytterbium(III) oxide, and 7.7 mole % boron trioxide.
17. A method of manufacture including fabricating the fiber of any of the preceding examples.
18. The method of manufacture of example 17, where the method includes fabricating a fiber preform, where:
optionally, the preform is fabricated via stack and draw;
optionally, the preform is fabricated via sol-gel;
optionally, the preform is fabricated via by placing a core preform in a cladding sleeve preform; and
optionally, the preform is fabricated via chemical vapor deposition on a preform lathe.
19. The method of manufacture of either of examples 17 or 18, where the method includes extruding a fiber preform.
20. A fiber with any feature or combination of features from the preceding examples or specification.
21. A method including implementing the fiber of example 20, where optionally, the fiber is implemented as a portion of a system.
22. A method of manufacturing including fabricating the fiber of example 20.

Various implementations have been specifically described. However, many other implementations are also possible.

What is claimed is:

1. A fiber including:
a cladding; and
a core, wherein:
the core and cladding are formed to support multimode guiding at about room temperature and fewer modes guided at a guiding temperature above room temperature,
the fiber includes a bend with bending loss, and
the bending loss over the bend for a higher order mode increases with a fiber temperature above room temperature, and the bending loss over the bend increases disproportionately with temperature for the higher order mode relative to a fundamental mode.

2. The fiber of claim 1, where the core is configured to have a thermo-optic coefficient less than that of the cladding.

3. The fiber of claim 2, where the core is configured to have a thermo-optic coefficient that has a negative value.

4. The fiber of claim 1, where the fiber includes at least a portion of a gain medium of a fiber laser or a fiber amplifier.

5. The fiber of claim 1, the core includes a dopant, where the dopant includes phosphorus pentoxide, aluminum oxide, aluminum phosphate, boron trioxide, fluorine, or any combination thereof.

6. The fiber of claim 1, the core is doped with an active ion.

7. The fiber of claim 1, the fiber supports single mode guiding in a guiding temperature range, where the guiding temperature range includes the guiding temperature.

8. The fiber of claim 7, where a V-number of the fiber is less than 2.405 when the fiber is within the guiding temperature range, where the V-number is defined to be $$\frac{\pi D \sqrt{n_{core}^2 - n_{clad}^2}}{\lambda},$$

where is D a diameter of the core, $n_{core}$ is an index of the core, $n_{clad}$ is an index of the cladding, and $\lambda$ is a wavelength of guided light.

9. The fiber of claim 1, wherein the fiber supports guiding for three or more modes at room temperature.

10. The fiber of claim 1, wherein:
the cladding has a non-uniform thermo-optic coefficient profile along a radius of the cladding.

11. The fiber of claim 1, wherein:
a mode field cross-sectional size increases with an increasing temperature of the fiber.

12. The fiber of claim 1, wherein:
the core includes a plurality of dopants; and
the plurality of dopants comprises phosphorus pentoxide and boron trioxide.

13. A fiber including:
a cladding;
a core surrounded by the cladding,
the core configured to support propagating light in multiple guided modes at about room temperature, the multiple guided modes including a fundamental mode; and
the core configured to, at a guiding temperature above room temperature, support propagating light in the fundamental mode and cause another mode of the multiple guided modes to not be guided,
wherein the fiber includes a bend with bending loss, and the bending loss over the bend for a higher order mode increases with a fiber temperature above room temperature, and the bending loss over the bend increases disproportionately with temperature for the higher order mode relative to a fundamental mode.

14. The fiber of claim 13, wherein:
the cladding has a non-uniform thermo-optic coefficient profile along a radius of the cladding.

15. The fiber of claim 13, wherein:
a mode field cross-sectional size increases with an increasing temperature of the fiber.

16. The fiber of claim 13, wherein:
the core includes a plurality of dopants; and
the plurality of dopants comprises phosphorus pentoxide and boron trioxide.

* * * * *

UNITED STATES PATENT AND TRADEMARK OFFICE
CERTIFICATE OF CORRECTION

PATENT NO. : 12,072,521 B2
APPLICATION NO. : 17/079090
DATED : August 27, 2024
INVENTOR(S) : Peter D. Dragic et al.

It is certified that error appears in the above-identified patent and that said Letters Patent is hereby corrected as shown below:

In the Specification

Column 4, Line 36, delete "LT" and insert in its place --$\Delta T$--.

Column 5, Line 52, delete "do/dT" and insert in its place --dn/dt--.

Signed and Sealed this
Eighth Day of October, 2024

Katherine Kelly Vidal
*Director of the United States Patent and Trademark Office*